United States Patent [19]

McCullough, Jr. et al.

[11] Patent Number: 4,869,962
[45] Date of Patent: * Sep. 26, 1989

[54] ASBESTOS-LIKE STRUCTURES

[75] Inventors: Francis P. McCullough, Jr., Lake Jackson, Tex.; Eckel R. Lane, Midland, Mich.; Bhuvenesh C. Goswami, Clemson, S.C.; David M. Hall, Auburn, Ala.

[73] Assignee: The Dow Chemical Company, Midland, Mich.

[*] Notice: The portion of the term of this patent subsequent to Jun. 6, 2006 has been disclaimed.

[21] Appl. No.: 149,747

[22] Filed: Jan. 29, 1988

[51] Int. Cl.$^4$ .................. B32B 9/00; B32B 5/02; A41D 19/00
[52] U.S. Cl. ...................... 428/408; 2/167; 428/222; 428/280; 428/284; 428/902; 428/920
[58] Field of Search ............. 428/408, 222, 284, 280, 428/367, 371, 902, 906, 920, 369

[56] References Cited

U.S. PATENT DOCUMENTS 4,359,783  11/1982  Andrews ..................... 2/161
4,756,941  7/1988  McCullough et al. ........ 428/97 X

FOREIGN PATENT DOCUMENTS 8606110  10/1986  PCT Int'l Appl. ............ 428/408
8802695  4/1988  PCT Int'l Appl. ............ 428/408

Primary Examiner—Ellis P. Robinson
Assistant Examiner—Susan S. Rucker
Attorney, Agent, or Firm—John Lezdey; Joe R. Prieto

[57] ABSTRACT

A non-flammable light weight non-carcinogenic asbestos-like thermal insulation and flame barrier structure comprising at least one layer of carbonaceous fibers and a suitable binder, said carbonaceous fibers being non-linear and having a reversible deflection ratio of greater than 1.2:1, an aspect ratio of greater then 10:1 and an LOI value of greater than 40.

19 Claims, 1 Drawing Sheet ance with the test method of ASTM D 2863-77 have a...

ASBESTOS-LIKE STRUCTURES

CROSS REFERENCE TO RELATED APPLICATIONS

This application is related to Application Ser.No. 918,738 filed October 14, 1986, entitled THERMAL INSULATION of McCullough, et al, now abandoned.

FIELD OF THE INVENTION

The present invention relates to non-abrasive non-flammable thermal insulation and flame barrier fabrics having a high degrees of thermal insulation quality at a low bulk density which can be utilized as a substitute for structures prepared from asbestos. More particularly, the invention provides shape reforming lightweight non-flammable fiberous structures of carbonaceous materials having low heat conductivity, excellent thermal insulation characteristics and which can provide a barrier against flames and molten metals with substantially no flame effecting shrinkage.

BACKGROUND OF THE INVENTION

The fields of application aimed at in the present invention are those similar to asbestos, namely, where the product required should have a very low heat conductivity as well as excellent resistance and dimensional stability at high temperatures, namely, at temperatures higher than 1000° C. By way of indication, these fields cover, for example, fire fighting clothing, fire trap partitions for flame temperatures exceeding 1000° C., heat insulation for thermal treatment furnaces used in metallurgy, the siderurgy, the ceramic industry or in cassting molten metals.

Until the discover of the carcinogenic effects of asbestos, asbestos structures such as thermal suits, gloves, mats and the like as thermal and flame shields, have been preferred in industry. Asbestos possesses the preferred qualities of light weight flexible, substantially no flame shrinkage, and the ability to form fabrics. Asbestos had also been a preferred fiber for forming molten metal shields because the molten metal did not adhere and the structure absorbed impact by particles so that a ricochet problem was not present. Also, asbestos exhibited good shape reforming characteristics.

The use of various synthetic fibers such as Kevlar (Trademark), Teflonic (Trademark), polybenzylimidazoles, and the like, have been used as replacements but have been proved to be unsatisfactory and costly. Use of such prior art synthetic fabrics provded to be abrasive, irritating to the skin, too bulky and heavy when a suitable thickness was obtained for thermal insulation. Also, there was some shrinkage under a direct flame which could be critical if the thickness is critical. In addition, none of the fibers formed a structure which could absorb impact of particles so as to avoid substantial ricochet of particles.

Ceramic fibers have also been employed in fire fighting structures either alone or in combination with synthetic fibers. However, ceramic fibers have high bulk densities so that they cannot be used in many practical situations and they provide limited mobility when made into garments.

U.S. Patent application Ser. No. 856,305, filed October 10, 1987, of McCullough, et al, entitled "Carbonaceous Fibers with Spring-Like Reversible Deflection and Method of Manufacture", which is herewith incorporated by reference, discloses non-linear carbonaceous fibers which can be utilized in the invention. The carbonaceous fibers have a carbon content at least 65% and are prepared by the heat treatment of stabilized polymeric fibers, particularly stabilized acrylic fibers. Such fibers derived from acrylic fibers have a nitrogen content of 5 to 35%. Preferred precursor fibers are derived from pitch (petroleum or coal tar), polyacetylene, polyacrylonitrile based materials, polyphenylene, and the like.

U.S. Pat. No. 4,359,783 to Andrews, which is herein incorporated by reference, discloses garments comprised of synthetic fibers which can be utilized in hot or cold environments. However, a higher bulk density of the synthetic fibers is necessary to achieve the same thermal protection capable with the carbonaceous fibers used in the present invention.

The carbonaceous fibers used in the invention according to the test method of ASTM D 2863-77 have a LOI value greater than 40. The test method is also known as "oxygen index" or "limited oxygen index" (LOI). With this procedure the concentration of oxygen in $O_2/N_2$ mixtures is determined at which the vertically mounted specimen-ignited at its upper end-just continues to burn.

The term "stabilized" herein applied to fibers or tows which have been oxidized at a specific temperature, typically less than about 250° C. for PAN fibers, provided it is understood that in some instances the filament and or fibers are oxidized by chemical oxidants at lower temperatures.

The term "Reversible Deflection" or "Working Deflection" is used herein as it applies to a heical or sinusoidal compression spring. Particular reference is made to the publication "Mechanical Design-Theory and Practice", MacMillan Publ. Co., 1975, pp 719 to 748; particularly Section 14–2, pages 721–24.

SUMMARY OF THE INVENTION

The present invention provides a non-flammable non-carcinogenic asbestos-like thermal insulation fabric structure having a high degree of thermal insulation quality at a low bulk density which can be employed as a substitute for similar asbestos structures. The structure is comprised of at least one layer of non-flammable, non linear carbonaceous fibers having low heat conductivity, a reversible deflection of greater than 1.2:1, an aspect ratio of greater than 10:1, and an LOI value of greater than 40. Preferably, the layer has a bulk density of about 0.4 to 6 lb/ft.$^3$. The non-linear fibers may be sinusoidal and/or coil-like in configuration. Advantageously, a greater amount of is coil-like fibers are utilized in the structures.

In accordance with one embodiment of the invention there is provided garments, such as work gloves, which provide a thermal barrier so as to protect the wearer against excessive temperature conditions.

In accordance with another embodiment of the invention there is provided a light weight mat or blanket for use in protection against molten metals.

It is therefore an object of the invention to provide a non-flammable asbestos-like thermal insulation fabric structure which can be employed in lieu of asbestos.

It is another object of the invention to provide asbestos-like fire shielding clothing comprising a web of non-linear carbonaceous fibers.

It is yet another object of the invention to provide a shield against molten metals which is light weight and resistant to thermal shock from molten metals.

Other objects and a fuller understanding of the invention will be had by referring to the following description and claims of a preferred embodiment, taken in conjunction with the accompnying drawings, wherein like reference characters refer to similar parts throughout the several views.

DESCRIPTION OF THE PREFERRED EMBODIMENT OF THE INVENTION

Figure 1:
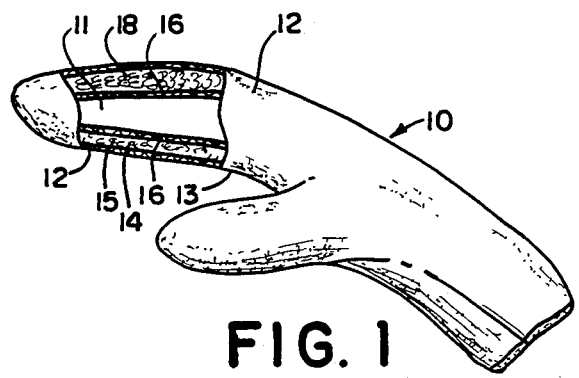
FIG. 1 is a perspective view partially in cross-section of a glove according to the invention.

Although specific terms are used in the following description for the sake of clarity, these terms are intended to refer only to the particular structure of the invention selected for illustration in the drawings, and are not intended to define or limit the scope of the invention.

Representation of the garments of the invention is the glove 10 which is shown in FIG. 1 of the drawing. The glove 10 preferably comprises an outer layer 12 of a non-woven web formed from the linear and/or non-linear carbonaceous fibers of the invention. On the palm portion 13 covered by the outer layer 12 of the glove 10 there is provided a web 14 of non-linear carbonaceous fibers 15. The fibers of the web 14 are preferably coil-like and have a carbon content of about 65 to 85%. The fibers of the web 14 are suitably bonded with a binder material, which is preferalby a polyester or a thermoset resin. The web 14 advantageously has a bulk density of about 0.4 to 6 lb/ft$^3$. The thickness of the web 14 is dependent upon the ultimate utility of the glove 10 and the temperature environment that the glove is utilized. Also, the thickness depends upon the amount of manipulation required by the hand to perform a special function. As a result of the low thermal transfer of the non-linear carbonaceous fibers and their compressibility, a lower amount of carbonaceous fibers than other synthetic fibers, such as Kevlar or Nomex (Trademarks of E.I. du Pont de Nemours & Co. for aramid fibers), may be utilized.

The backside portion of the glove 10 may comprise a web 18 which is similar to web 14 that is covered by an outer layer 12. However, web 18 may be thicker than web 14 since it does not materially affect the gripping ability of a user of the glove 10.

The inner lining 16 for the hand portion 11 may comprise any knit or non-woven fabric. Preferably, the lining comprises a knit fabric of linear carbonaceous fibers or a blend of the linear carbonaceous fibers with other synthetic or natural fibers so as to provide an improved thermal and non-flammable characteristics throughout the glove 10. The carbonaceous fibers when blended with other synthetic or natural fibers result in a synergistic flame retarding structure. A similar synergism is found with the binders which are utilized to produce the webs used in the invention. The binder may be in the form of a spary coating, fiber, melt, etc. Representative of such binders include copolymers of acrylic acid, polyesters, polyamides, polyolefins, copolymers of polyacrylonitrile, cotton and the like.

The non-woven web may be produced by any conventional process such as by use of carding or garnet machines and the aforementioned binders.

Figure 2:
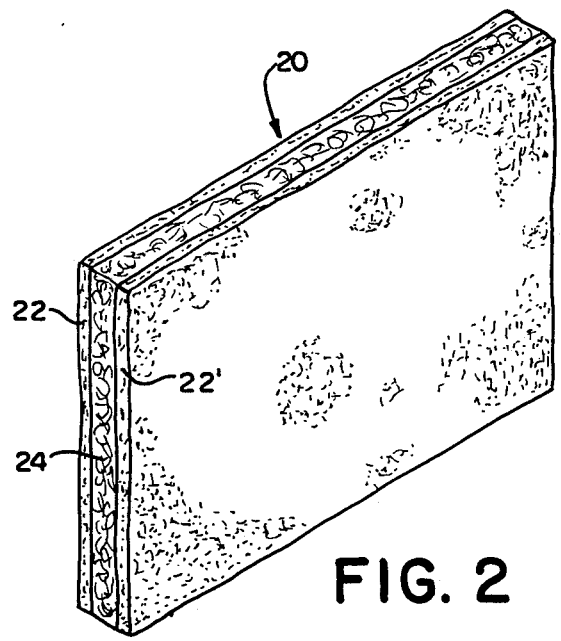
FIG. 2 is a perspective view partially in cross-section of a barrier against molten metals according to the invention.

FIG. 2 illustrates a structure 20 which may be utilized as a blanket or barrier against molten metals in refineries, in arc welding operations, and the like where molten particles and sparks may be present. The structure 20 comprises outer layers 22, 22' of woven or non-woven sheets of carbonaceous fibers 15. The fibers 15 may be linear and/or non-linear. The non-linear fibers are generally of a sinusoidal and/or coil-like configuration. Preferably, the fibers 15 have a carbon content greater than 85%.

At least one web 24 is provided between the layers 22, 21' to act as a thermal barrier and shield against extreme temperatures. The web 24 comprises non-linear carbonaceous fibers wherein a greater portion of the non-linear fibers is coil-like in configuration so as to provide a porosity which enhances both the thermal barrier and flame retarding characteristics of the blanket or barrier. The bulk density of the web is preferably about 0.14 to 6 lb/ft$^3$. However, it is understood that the web may be densified for a particular use. The web will ordinarily have a thickness in the range up to 2 inches (5.0 cm), but may be built up in multiple plies depending upon the desired end use of the material.

The precursor stabilized acrylic filaments which are advantageously utilized in preparing the carbonaceous fibers of the invention are selected from the group consisting of acrylonitrile homopolymers, acrylonitrile copolymers and acrylonitrile terpolymers.

The copolymers and terpolymers preferably contain at least about 85 mole percent of acrylic units, preferably acrylonitrile units, and up to 15 mole percent of one or more monovinyl units selected from the group consisting of styrene, methylacrylate, methyl methacrylate, vinyl chloride, vinylidene chloride, vinyl pyridene, and the like which copolymerized with the acrylic units.

Preferred precursor materials are prepared by melt spinning or wet spinning the precursor materials in a known manner to yield a monofilament or milti-filament fiber tow. The fibers or filaments are formed into a yarn, woven cloth, fabric knitted cloth and the like by any of a number of commercially available techniques, heated, preferably to a temperature above about 525° C. in a non-oxidizing atmosphere and thereafter deknitting and carded to produce a wool-like fluff which may be laid up in batting-like form.

The carbonaceous fibers which are utilized for preparing the web of the present invention preferably comprise the heat set non-linear fibers that are described in the aforementioned application Ser. No. 918,738. Most preferable are those derived from stabilized acrylic filaments and possess a nitrogen content of 16 to about 19%. When the fibers are intended to come into direct contact with flame or molten metal it is advantageous to utilize fibers having a carbon content of at least 85%.

Examplary of the products which can be structures of the present invention are set forth in the following examples. It is understood that the percentages referred to herein relate to percent by weight.

EXAMPLE A. Battings were made by blending an appropriate weight percent of a tow of carbonaceous fibers and low melting polyethylene acrylic acid in a blender/feed section of a sample size 12" Rando Webber Model B manufactured by Rando Machine Corp. of Macedon, NY. The battings produced typically were 1 inch (2.54 cm) thick and had bulk densities in a range of from 0.4 to 6 lb/ft$^3$. The battings were thermally bonded by passing the Rando batting on a conveyor belt through a thermal bonding oven at a temperature of about 300° C. B. A 6' x 12' fabric was knitted from a 3K PANOX OPF (R.K. Textiles) continuous stabilized filament tow on a flat bed knitting machine and heat treated in a nitrogen atmosphere at 950° C. until irreversibly heat set. The fabric was then folded and the batting of Part A was placed between the layers. The layers were then mechanically bonded by a needle punching process to form a light weight barrier for use in metallurgical operations.

The battings and/or fabric can be utilized in manufacturing a large variety of clothing, for example, jackets, coats, trousers, etc., or to form curtain barriers against flames and molten metals.

What is claimed is:

1. A non-flammable light weight non-carcinogenic asbestos-like thermal insulation and flame barrier structure comprising at least one layer of carbonaceous fibers and a suitable binder, said carbonaceous fibers being non-linear and having a reversible deflection ratio of greater than 1.2:1, an aspect ratio of greater than 10:1 and an LOI value of greater than 40.

2. The structure of claim 1, wherein said at least one layer comprises a batting of said non-linear carbonaceous fibers.

3. The structure of claim 1, wherein said non-linear carbonaceous fibers have a sinusoidal configuration.

4. The structure of claim 1, wherein said non-linear carbonaceous fibers have a coil-like configuration.

5. The structure of claim 1, comprising fibers having a carbon content of less 65 to 85%.

6. The structure of claim 1, wherein said layer possesses a bulk density of about 0.4 to 6 lb/ft$^3$.

7. The structure of claim 1, wherein said carbonaceous fibers are derived from stabilized acrylic fibers and said carbonaceous fibers have a percent nitrogen content of from about 5 to 35%.

8. The structure of claim 7, wherein said carbonaceous fibers have a nitrogen content of about 18 to 19%.

9. The structure of claim 1, comprising an outer layer of carbonaceous fabric.

10. The structure of claim 1, which is a garment.

11. The structure of claim 10, wherein said garment is a glove.

12. The structure of claim 10, which is a barrier against molten metal.

13. A non-flammable non-carcinogenic asbestos-like thermal insulation and flame barrier structure comprising at least one web of carbonaceous fibers and at least one layer of batting comprising non-flammable non-linear carbonaceous fiber having a reversible deflection ratio of greater than 1.2:1, an aspect ratio of greater than 10:1 and an LOI value of greater than 40, and a binder.

14. The structure of claim 13, wherein said structure comprises two webs cf linear carbonaceous fibers.

15. The structure of claim 13, wherein said non-linear fibers are of a sinusoidal configuration.

16. The structure of claim 13, wherein said non-linear fibers are of a coil-like structure configuration.

17. The structure of claim 13, which is a garment.

18. The structure of claim 17, wherein said garment is a glove.

19. The structure of claim 13, which is a blanket against molten metal.

* * * * *